(12) United States Patent
Yolitz

(10) Patent No.: US 10,066,728 B2
(45) Date of Patent: Sep. 4, 2018

(54) CONTINUOUSLY VARIABLE TRANSMISSION CLUTCH SHEAVE COVER

(71) Applicant: Deere & Company, Moline, IL (US)

(72) Inventor: Nathan Yolitz, Horicon, WI (US)

(73) Assignee: DEERE & COMPANY, Moline, IL (US)

( * ) Notice: Subject to any disclaimer, the term of this patent is extended or adjusted under 35 U.S.C. 154(b) by 109 days.

(21) Appl. No.: 14/925,683

(22) Filed: Oct. 28, 2015

(65) Prior Publication Data

US 2017/0045131 A1    Feb. 16, 2017

Related U.S. Application Data

(63) Continuation-in-part of application No. 14/824,582, filed on Aug. 12, 2015.

(51) Int. Cl.
| | |
|---|---|
| *F16H 55/56* | (2006.01) |
| *F16H 9/12* | (2006.01) |
| *F16H 57/00* | (2012.01) |
| F16H 57/02 | (2012.01) |
| F16H 57/031 | (2012.01) |
| F16H 57/035 | (2012.01) |
| F16H 57/04 | (2010.01) |

(52) U.S. Cl.
CPC ......... *F16H 55/56* (2013.01); *F16H 57/0006* (2013.01); *F16H 57/031* (2013.01); *F16H 57/035* (2013.01); *F16H 57/0416* (2013.01); *F16H 57/0489* (2013.01); *F16H 2057/02047* (2013.01)

(58) Field of Classification Search
CPC .. F16H 55/56; F16H 57/0416; F16H 57/0489; F16H 57/0006; F16H 57/031; F16H 57/035; F16H 2057/02047
See application file for complete search history.

(56) References Cited

U.S. PATENT DOCUMENTS

| | | |
|---|---|---|
| 1,207,242 A | 12/1916 | Turner |
| 2,842,974 A | 7/1958 | Neumann |
| 3,943,785 A | 3/1976 | Percifield |
| 4,493,677 A | 1/1985 | Ikenoya |
| 4,531,928 A | 7/1985 | Ikenoya |
| 4,671,782 A | 6/1987 | Ochiai et al. |
| 4,697,665 A | 10/1987 | Eastman et al. |
| 4,708,699 A | 11/1987 | Takano et al. |

(Continued)

FOREIGN PATENT DOCUMENTS

| | | |
|---|---|---|
| DE | 69518596 T2 | 5/2001 |
| DE | 102004027688 A1 | 1/2006 |

(Continued)

OTHER PUBLICATIONS

British Search Report in foreign counterpart application GB1612660.9 dated Jan. 12, 2017 (4 pages).

(Continued)

*Primary Examiner* — William E Dondero
*Assistant Examiner* — Robert T Reese

(57) ABSTRACT

A continuously variable transmission clutch sheave cover is a one-piece plastic member having a plurality of snap-fit fasteners located between an outer perimeter and a central opening. The snap-fit fasteners releasably engage features positioned on the face of an outer sheave of a driven clutch assembly.

8 Claims, 3 Drawing Sheets

(56) References Cited

U.S. PATENT DOCUMENTS

| | | | |
|---|---|---|---|
| 5,976,044 A | 11/1999 | Kuyama | |
| 6,120,399 A | 9/2000 | Okeson et al. | |
| 6,123,634 A * | 9/2000 | Faust | F16H 55/32 474/18 |
| 6,176,796 B1 | 1/2001 | Lislegard | |
| 6,267,700 B1 | 7/2001 | Takayama | |
| 6,938,508 B1 | 9/2005 | Saagge | |
| 7,070,527 B1 | 7/2006 | Saagge | |
| 7,281,596 B2 | 10/2007 | Fukuda | |
| 7,363,999 B2 | 4/2008 | Hastings | |
| 8,439,141 B2 | 5/2013 | Bessho et al. | |
| 8,776,930 B2 | 7/2014 | Tadych et al. | |
| 8,911,312 B2 | 12/2014 | Itoo et al. | |
| 2002/0065156 A1 | 5/2002 | Younggren et al. | |
| 2006/0160646 A1* | 7/2006 | Jaszkowiak | F16H 57/031 474/144 |
| 2006/0270503 A1 | 11/2006 | Suzuki et al. | |
| 2007/0219030 A1 | 8/2007 | Ho | |
| 2008/0257885 A1* | 10/2008 | Dreier | F16H 57/01 220/243 |
| 2009/0298627 A1 | 12/2009 | Johnson et al. | |
| 2014/0033996 A1 | 2/2014 | Sajdowitz | |
| 2014/0235390 A1 | 8/2014 | Urbanek | |

FOREIGN PATENT DOCUMENTS

| | | |
|---|---|---|
| DE | 102010011570 A1 | 10/2010 |
| EP | 2282081 A1 | 2/2011 |
| JP | S62237155 A | 10/1987 |
| JP | 2003232434 A | 8/2003 |
| JP | 2006029486 A | 2/2006 |

OTHER PUBLICATIONS

British Search Report in foreign counterpart application GB1612664.1 dated Jan. 13, 2017 (4 pages).

"Installing Primary Clutch Kit on Arctic Cat Wildcat Sport or Trail," 6gearz. YouTube Video [online], Feb. 21, 2015 [retrieved on Oct. 4, 2017]. Retrieved from the Internet<https://www.youtube.com/watch?v=OLrKdTqD838>.

Search Report issued in counterpart application No. DE102016214873.7, dated Jul. 31, 2017 (14 pages).

* cited by examiner

CONTINUOUSLY VARIABLE TRANSMISSION CLUTCH SHEAVE COVER

This application is a continuation-in-part of prior application Ser. No. 14/824,582, filed Aug. 12, 2015.

FIELD OF THE INVENTION

This invention relates to continuously variable transmissions for recreational or off road utility vehicles, and specifically to continuously variable transmission clutch sheave covers.

BACKGROUND OF THE INVENTION

Continuously variable transmissions (CVTs) used in recreational or off road utility vehicles use rubber belts to transmit torque between a drive clutch, or primary clutch, and a driven clutch, or secondary clutch. CVT belts are typically V-belts that are expected to remain in contact with the V-belt pulleys of the drive and driven clutches. Some CVTs have "loose" V-belts that are not pre-tensioned between the two clutches while in a static state. Under certain conditions, "loose" V-belts may lose contact with the driven clutch. More specifically, when a CVT belt is used under high load conditions at the CVT's lowest drive ratio, including initial starts or hill climbing, for example, the drive clutch may clamp onto the belt and tension only one side of the belt between the drive and driven clutches. With high tension on only one side of the CVT belt, the belt may slip on the driven clutch. When the slipping stops and the CVT belt engages the drive clutch, a ripple or wave may appear in the un-tensioned side of the belt. Slack in the un-tensioned side of the belt may increase or amplify the ripple or wave so much that the belt may lose contact momentarily with the driven clutch. Even brief loss of engagement or contact of the belt with the driven clutch allows the transmission and driveline to release stored torsional stress and rotate opposite of the drive clutch. This may result in torque spikes when the primary clutch re-engages the belt, and the torque spikes transfer through the transmission and cause undesirable vehicle performance at the lowest drive ratio, such as shuddering or jerking. There is a need for a CVT with a "loose" belt that maintains contact with a driven clutch at low drive ratios and improves vehicle performance during initial starts, hill climbs, and other high load conditions.

In the past, clutch sheave covers have been installed on driven clutches of some CVTs. A clutch sheave cover is a plate that fits over the top of structural members or features on the face of the driven clutch sheave in order to reduce turbulence, decrease clutch noise, and minimize or reduce power loss caused by those structural members or features. Threaded fasteners are commonly used to attach a clutch sheave cover to the driven clutch. However, threaded fasteners may slow assembly and increase difficulty and time to service a CVT. Some CVTs do not need clutch sheave covers because they lack structural members or features on the driven sheave face. However, most CVTs have structural members or features on the driven clutch face, and there remains a need for a low cost continuously variable transmission clutch sheave cover that also can minimize or reduce assembly and service costs.

SUMMARY OF THE INVENTION

A continuously variable transmission clutch sheave cover is a plate-shaped member covering a plurality of structural members on an outer sheave of a driven clutch assembly. Snap-fit fasteners on the plate-shaped member releasably engage pins, ledges or other clutch features located between the plurality of structural members on the outer sheave. The snap-fit fasteners can be manually engaged and disengaged without tools to minimize or reduce assembly and service costs.

DESCRIPTION OF THE PREFERRED EMBODIMENT

Figure 1:
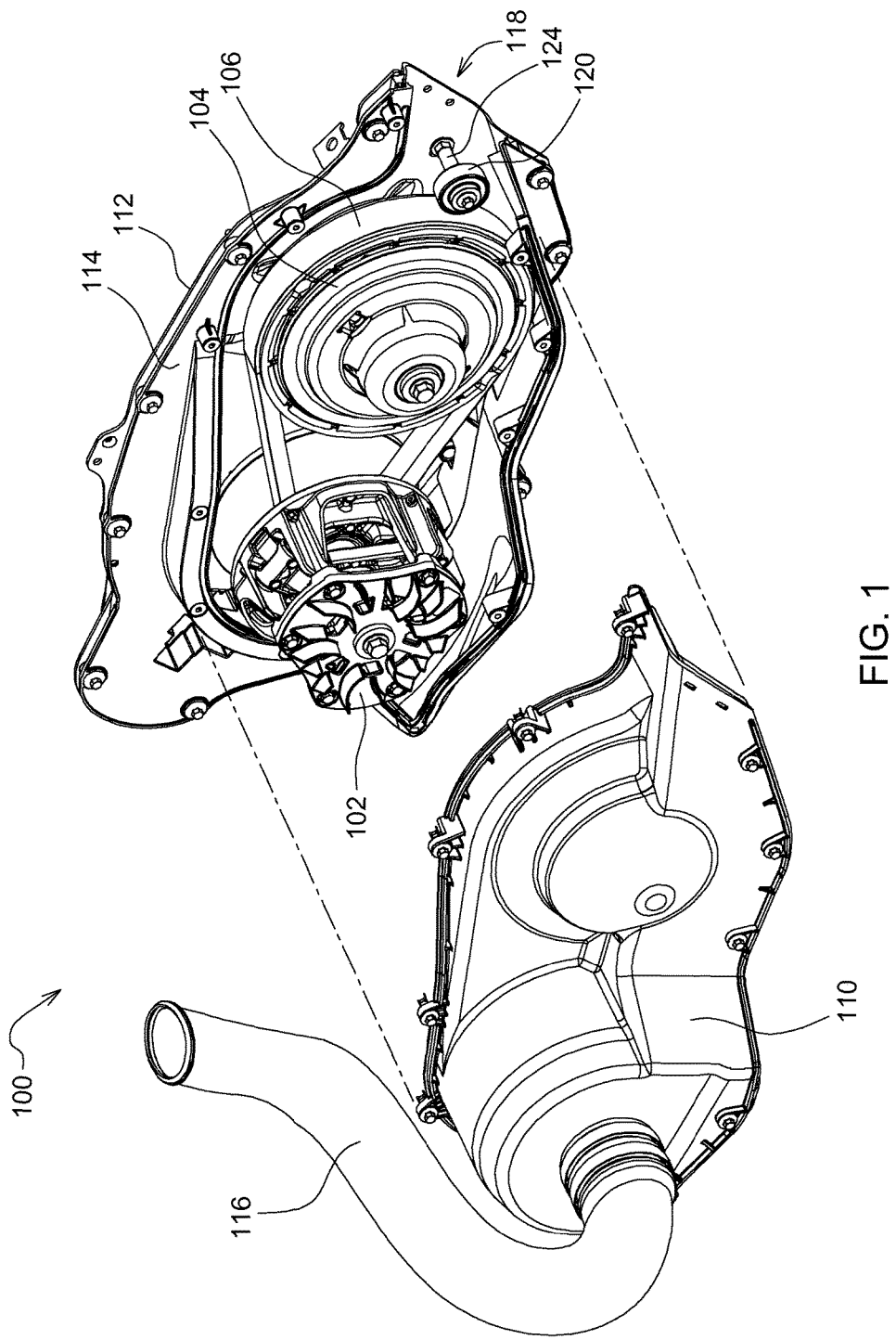
FIG. 1 is a partially exploded perspective view of a continuously variable transmission with a belt guide according to a first embodiment of the invention.
Figure 2:
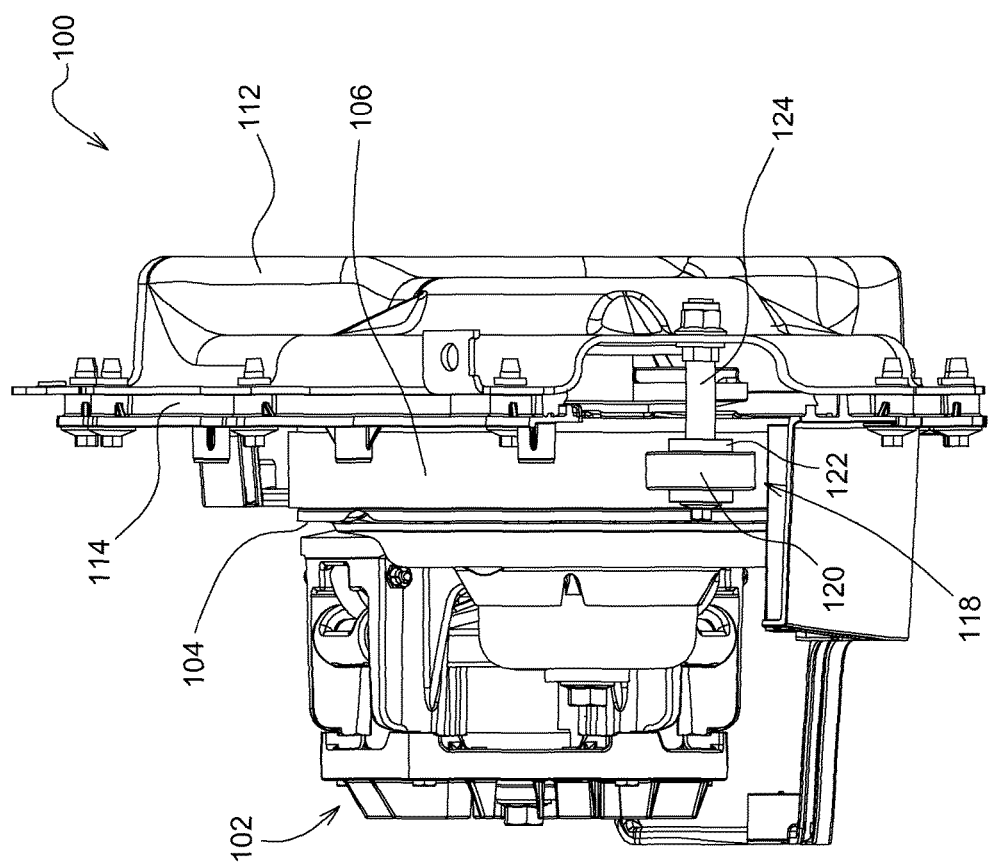
FIG. 2 is an end view of a continuously variable transmission with a belt guide according to a first embodiment of the invention.

FIGS. 1-2 show continuously variable transmission (CVT) 100 on a recreational or off-road utility vehicle. The CVT may include drive clutch assembly 102, also referred to as a primary clutch, and driven clutch assembly 104, also referred to as a secondary clutch. Each of the drive and driven clutch assemblies include a pulley that is split perpendicular to the axis of rotation. The CVT may be changed to any drive ratio between a lowest drive ratio and a highest drive ratio by moving the two sheaves of one pulley closer together and the two sheaves of the other pulley farther apart. CVT belt 106 may be a "loose" belt that is not pre-tensioned between the drive and driven clutches. The CVT belt also may be referred to as a V-belt because it has a V-shaped cross section so that it may ride higher on one pulley and lower on the other when it is around the drive and driven clutch assemblies.

In one embodiment, the drive and driven clutch assemblies of the CVT may be enclosed and supported by outer cover 110, back plate 112 and intermediate cover 114. The outer cover, back plate and intermediate cover may be secured together by threaded fasteners or clips to form a CVT housing. Air intake tube 116 may be connected to the CVT housing for providing cooling air to the CVT belt and clutches. Drive clutch assembly 102 also may include fins that rotate with the drive clutch assembly to draw air in through the air intake tube to the CVT housing.

In one embodiment, CVT belt guide 118 may be positioned inside the CVT housing next to the driven clutch assembly. The CVT belt guide may include bearing 120 which may contact the CVT belt at the CVT's lowest drive ratio. The bearing may be any circular, cylindrical or roller shaped part, or bushing, that bears friction and is rotatable on an axis parallel to the drive and driven clutches. The bearing is positioned in close proximity with the CVT belt, and may rotate if contacted by the CVT belt. For example, the bearing's outer surface may be located between about 0 mm and about 2 mm from the V-belt when the V-belt is at the outer or maximum circumference of the driven clutch assembly. When the CVT belt guide contacts and rotates with the CVT belt, the CVT belt guide prevents any ripples or waves in the slack portion of the belt from losing contact with the driven clutch assembly at low drive ratios.

In one embodiment, CVT belt guide 118 may include one or more bushings 122 on a first end of guide post 124. The bushings may provide shoulders on each side of bearing 120 to locate the bearing in a rotatable position aligned with the V-belt on the driven clutch. Guide post 124 may include a base that is mounted and secured to the CVT housing, and specifically to back plate 112.

Figure 3:
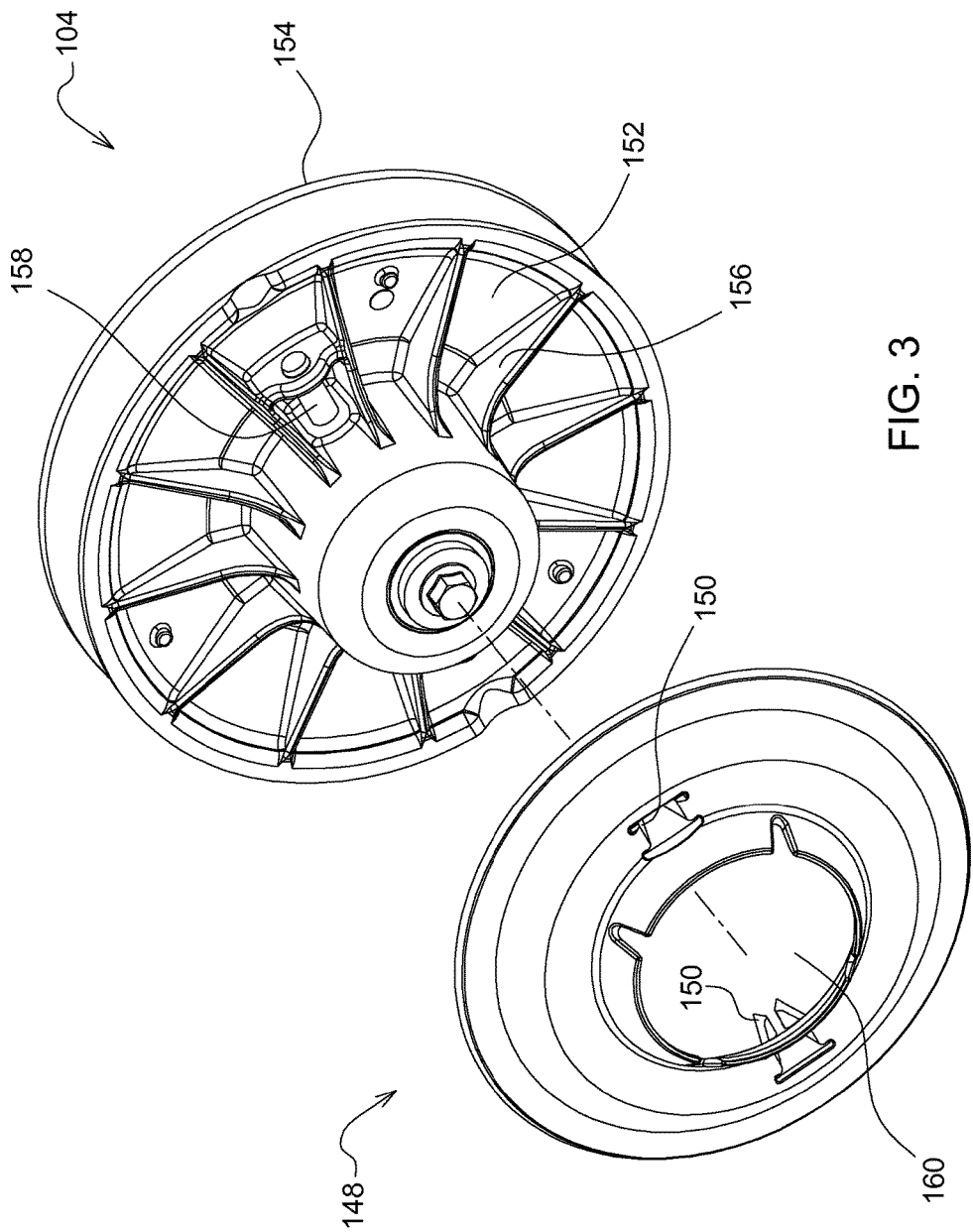
FIG. 3 is a perspective view of a continuously variable transmission clutch sheave cover according to a first embodiment of the invention.

FIG. 3 shows continuously variable transmission clutch sheave cover 148 according to an embodiment of the present invention. The continuously variable transmission clutch sheave cover may be a plate-shaped plastic member that may be attached to outer sheave 152 of driven clutch assembly 104 using snap-fit fasteners 150. For example, snap-fit fasteners 150 may project or extend axially from one side of the clutch sheave cover into engagement with pins 158, ledges or other features, on the face of outer sheave 152.

In one embodiment, the continuously variable transmission clutch sheave cover, including the plurality of snap-fit fasteners, may be a one piece plastic member. The snap-fit fasteners may be symmetrically located around the cover, to naturally balance the cover. The snap-fit fasteners may be located radially between the outer perimeter and the center axis or central opening 160 of the cover. The snap-fit fasteners may extend or project axially from the cover to contact and releasably engage pins 158, ledges or other features on outer sheave 152 of driven clutch assembly 104. The plurality of pins, ledges or other features on the outer sheave of the driven clutch assembly may be positioned between a plurality of structural members or features 156 on the driven clutch face.

In one embodiment, the continuously variable transmission clutch sheave cover may be easily installed manually on the driven clutch assembly without tools, by pressing the cover onto the outer sheave to engage the snap-fit fasteners. The cover also may be easily removed manually by prying or pulling on the cover without tools to disengage and release the snap-fit fasteners. As a result, the continuously variable transmission clutch sheave cover reduces time and costs for assembly and service. The continuously variable transmission clutch sheave cover also provides a low cost device for providing the performance advantages of reduced turbulence, decreased clutch noise, and minimized or reduced power loss.

Having described the preferred embodiment, it will become apparent that various modifications can be made without departing from the scope of the invention as defined in the accompanying claims.

The invention claimed is:

1. A continuously variable transmission clutch sheave cover, comprising:
    a one-piece plastic member covering structural members on the face of an outer sheave of a driven clutch assembly having an inner sheave that is moveable relative to the outer sheave to continuously vary a drive ratio while rotating together with the outer sheave, the one-piece plastic member having an outer perimeter, a central opening, and a plurality of snap-fit fasteners that are integral with the one-piece plastic member and are located radially between the outer perimeter and the central opening.

2. The continuously variable transmission clutch sheave cover of claim 1 wherein the features on the face of the outer sheave are a plurality of pins, the snap-fit fasteners releasably engaging the pins.

3. The continuously variable transmission clutch sheave cover of claim 2 wherein the pins on the face of the outer sheave are between a plurality of structural members on the face of the outer sheave of the driven clutch assembly.

4. The continuously variable transmission clutch sheave cover of claim 1, wherein the plurality of snap-fit fasteners are symmetrically located on the one-piece plastic member.

5. A continuously variable transmission clutch sheave cover, comprising
    a one-piece plate-shaped member covering a plurality of structural members on an outer sheave of a driven clutch assembly having an inner sheave that is moveable relative to the outer sheave to continuously vary a drive ratio while rotating with the outer sheave;
    a plurality of snap-fit fasteners that integrally extend from the one-piece plate-shaped member between a central opening and an outer perimeter to releasably engage a plurality of features on the outer sheave located between the plurality of structural members on the outer sheave, the snap-fit fasteners being the only fastening between the one-piece plate-shaped member and the outer sheave.

6. The continuously variable transmission clutch sheave cover of claim 5, wherein the snap-fit fasteners are between an outer perimeter and a central opening in the plate-shaped member.

7. A continuously variable transmission clutch sheave cover, comprising:
    a one-piece plate-shaped member that is manually engageable to an outer sheave of a driven clutch assembly by pressing the plate-shaped member against the outer sheave to engage a plurality of snap-fit fasteners on the one-piece plate shaped member which are the only fasteners to the outer sheave;
    the one-piece plate-shaped member rotating with the outer sheave and with an inner sheave of the driven clutch assembly that is moveable relative to the outer sheave to continuously vary a drive ratio, and covering a plurality of radially extending structural members on the outer sheave, and covering a plurality of features engaging the plurality of snap-fit fasteners between the structural members.

8. The continuously variable transmission clutch sheave cover of claim 7, wherein the plurality of snap-fit fasteners are symmetrically located on the plate-shaped member.

* * * * *